US006994106B1

(12) United States Patent
Hackley et al.

(10) Patent No.: US 6,994,106 B1
(45) Date of Patent: Feb. 7, 2006

(54) FIRE HYDRANT LOCKING DEVICE

(75) Inventors: Charles L. Hackley, Geneva, IL (US); Gerald J. Weiland, Geneva, IL (US); King C. Embry, Winnetka, IL (US)

(73) Assignees: Plasticsworks, Inc., Addison, IL (US); Utility Supply of America, Inc., Waukegan, IL (US)

( * ) Notice: Subject to any disclaimer, the term of this patent is extended or adjusted under 35 U.S.C. 154(b) by 0 days.

(21) Appl. No.: 11/010,492

(22) Filed: Dec. 13, 2004

(51) Int. Cl.
*F11K 35/00* (2006.01)

(52) U.S. Cl. .................. 137/385; 137/382; 70/178; 70/180; 70/186

(58) Field of Classification Search ............. 137/382, 137/385; 70/178, 180, 186
See application file for complete search history.

(56) References Cited

U.S. PATENT DOCUMENTS

| 1,830,667 A | * | 11/1931 | Lolley ..................... 70/178 |
| 1,993,784 A | * | 3/1935 | Henderson ................ 70/180 |
| 4,936,636 A | * | 6/1990 | Matsuda ................... 303/157 |
| 5,469,724 A | * | 11/1995 | Pollard ..................... 70/178 |
| 6,691,732 B2 | * | 2/2004 | Fleury et al. ............. 137/296 |
| 6,920,894 B1 | * | 7/2005 | Nickeas et al. .......... 137/385 |

* cited by examiner

Primary Examiner—A. Michael Chambers
(74) Attorney, Agent, or Firm—John L. Schmitt

(57) ABSTRACT

A locking device to inhibit unauthorized operation of a fire hydrant includes a locking plug having a bottom opening that fits over an actuating nut of the hydrant. The locking plug has a cylindrically-shaped body formed with an upper actuator nut. A peripheral groove in a sidewall of the plug body is located above a set of inward extending, threaded bores for set screws to affix the locking plug to the hydrant actuating nut. Fitting over the plug is a cap having a passageway that intersects tangentially with the plug groove. A locking pin on a hasp bracket then is inserted into the cap passageway to form an interference fit with the plug groove. Rotating the bracket upward positions a staple post on the cap in a slot in the hasp bracket. A padlock then secures the position of the hasp bracket to inhibit access to the plug actuator nut and operatively connected hydrant actuating nut.

11 Claims, 4 Drawing Sheets

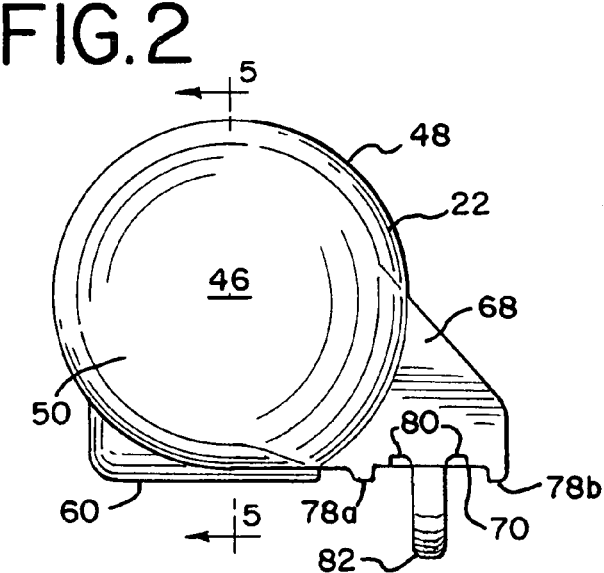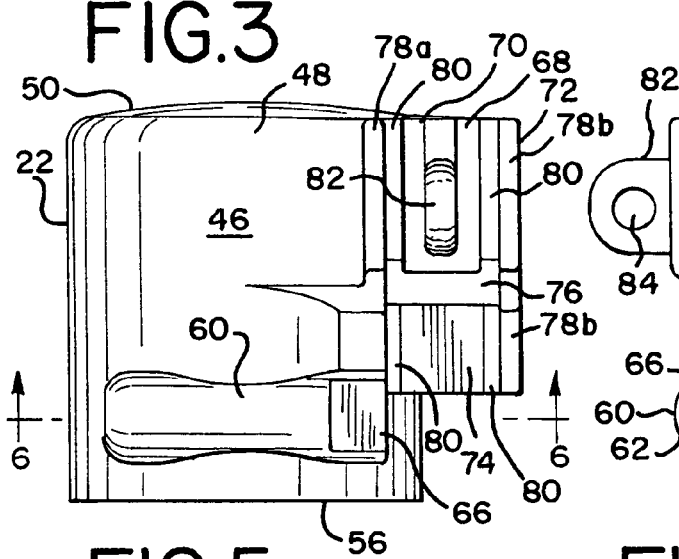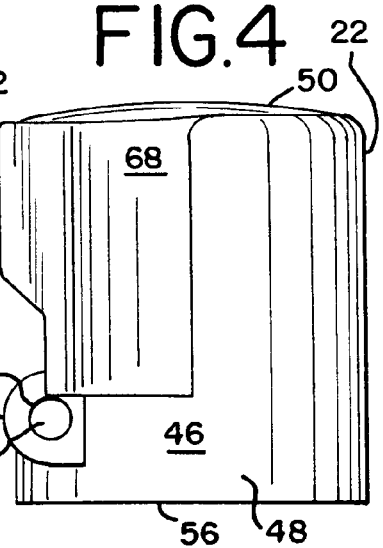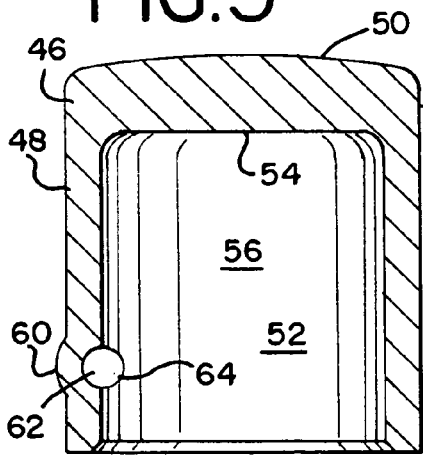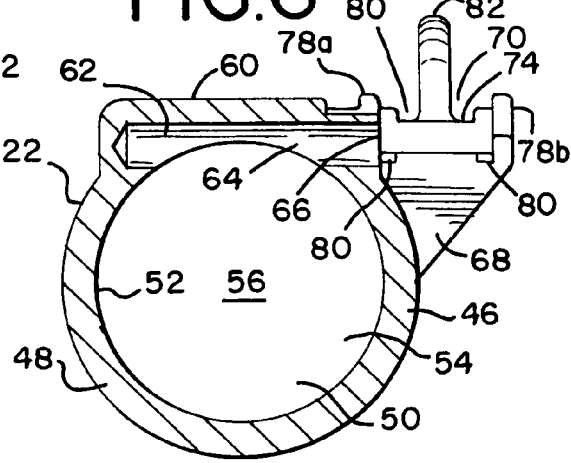

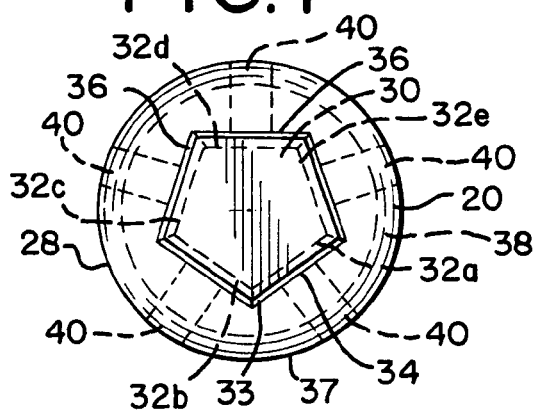
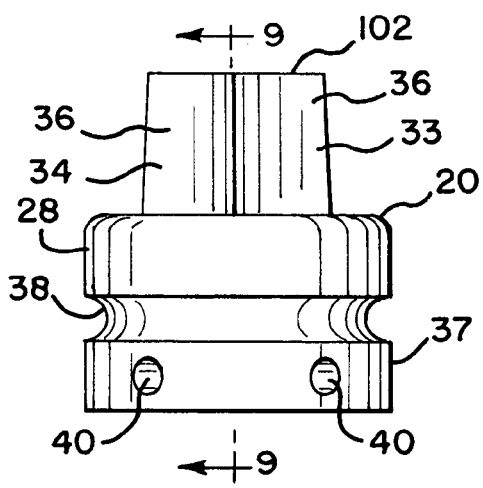
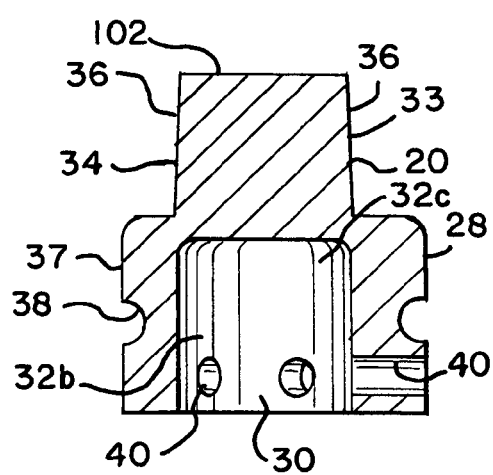
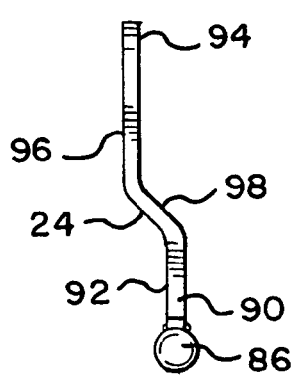
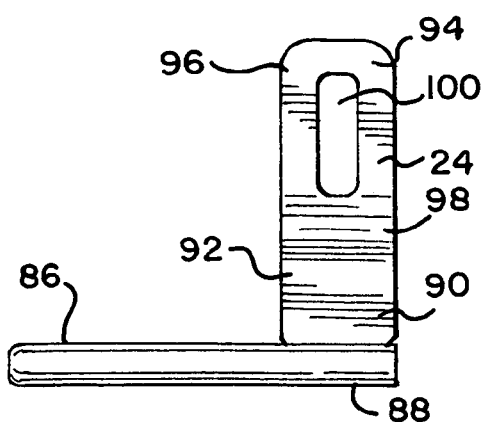

FIRE HYDRANT LOCKING DEVICE

BACKGROUND OF THE INVENTION

1. Field of the Invention

This invention relates to locking devices and more particularly is a locking device adapted for attachment to a fire hydrant to inhibit unauthorized operation of the hydrant.

2. Prior Art

Locking devices to prevent unauthorized operation of fire hydrants are well known and have been in use for a number of years.

A first example of a fire hydrant locking device is disclosed in U.S. Pat. No. 3,556,131. The device includes a dome-shaped upper element formed with an inner recess. This inner recess is divided into an upper, small diameter portion and a lower, larger diameter threaded portion. Fitting in the dome element upper portion recess is an upper, large cylindrical part of an actuating nut element. This actuating nut element is formed with an inner opening and three radially spaced apart threaded bores for set screws to secure the nut element to an actuating nut of the hydrant. The nut element further includes a lower, small diameter cylindrical part that forms an offset for a ring-shaped element. This ring element has peripheral external threads to interconnect with the dome element internal threads. At attached, the cap and ring element are free to rotate with respect to the actuating nut element. As the locking device is positioned on the hydrant nut, a gap between a top of the hydrant and a bottom of the locking device allows insertion of the tool to rotate the hydrant actuating nut.

An example of a fire hydrant that includes tamper proof structure is set out in U.S. Pat. No. 4,566,481. In this case, an actuating nut of the hydrant is formed with a horizontally positioned annular groove. Positioned in this groove are inner portions of two C-clips. Outer portions of these C-clips then are located in a space defined by an upper annular recess in a lower retaining portion and a bottom annular surface of a dome-shaped cap member. In a lower surface of the retaining portion is a pair of oppositely positioned downward facing holes. The cap member and lower retaining portion are threadedly joined. As the assembled retaining portion and cap are positioned on the hydrant actuating nut, a small gap between a top closure member of the hydrant and the lower surface of the retaining portion allows insertion of operative ends of a flat wrench. This wrench has pins that fit into the retaining portion holes to allow the wrench to rotate the operatively connected hydrant actuating nut.

Another example of a fire hydrant that includes actuating nut tamper proof structure is disclosed in U.S. Pat. No. 4,936,336. This structure includes a shroud, a cap, and an actuating body that fits inside the shroud and extends upward into the cap. This actuating body is formed with a polygonal-shaped recess that fits over an actuating nut of the hydrant. The actuating body is secured to the hydrant nut by a set of sets screws operatively carried in threaded bores in the actuating body. The shroud is secured to the actuating body by a snap ring positioned in aligning annular grooves in a sidewall of the actuating body and in a sidewall of an inner cylindrical recess of the shroud. Access to these set screws is provided by a threaded bore in the shroud sidewall that is sealable by a plug having a selective curvilinear grooved outer face. The cap is joined to an upper portion of the actuating body by a second snap ring positioned in respective aligning annular grooves inside the cap and in a sidewall of the actuating body. As the cap is located, there is a narrow gap between a bottom edge of the cap and a top edge of the shroud. This gap allows insertion of a head of a wrench to rotate the actuating body that in turn rotates the hydrant actuating nut.

Lastly, U.S. Pat. No. 5,205,312 sets out a fire hydrant locking arrangement that includes an inner cylindrical member that fits inside an outer cylindrical member. An outer cylindrical wall surface of the inner member and inner cylindrical wall surface of the outer member are formed with respective aligning circumferential groove portions. These groove portions connect with aligning bores in sidewalls of the inner and outer members that allow insertion of an end of a ductile, low melting temperature metal rod. Rotation of the outer cylindrical portion pulls the rod through the outer portion bore to fill the groove portions and form a 360 degree locking ring. To gain access to the inner cylindrical member and operatively joined hydrant actuating nut, the structure is heated to 1,466 degrees F. to melt the locking ring.

Further fire hydrant locking devices and hydrant tamper proof structure are set out in U.S. Pat. Nos. 4,526,193, 4,825,898, 5,630,442, 5,632,301, 5,722,450, and 5,727,590.

SUMMARY OF THE INVENTION

A locking device, particularly adapted to inhibit unauthorized operation of a fire hydrant, includes a locking plug, a cap, a hasp bracket, and a padlock. The locking plug has a cylindrical body formed with a downward facing inner opening and an upward extending tool engagable actuator nut. The plug inner opening is prepared to operatively fit over an activating nut (typically square or pentagonally-shaped) of the fire hydrant while the plug actuator nut has a pentagonal shape for operative engagement with a standard hydrant actuating wrench. In a sidewall of the plug are a peripheral groove and a set of spaced part threaded bores that extend inward to intersect with sides of the plug inner opening.

The locking device cap has an impact resistant body defined by a cylindrically-shaped sidewall that connects with a dome-shaped top wall to define a downward facing inner opening for operative disposition of the locking plug. Extending outward from the cap sidewall is a horizontally positioned locking pin cylinder having a passageway that intersects tangentially with an inner surface of the cap sidewall to form an arcuate-shaped slot in the cap sidewall. Carried by the cap next to an entrance end of the cap locking pin passageway is a hasp bracket support. This support includes a vertical channel located between side ribs and formed with a pair of spaced apart grooves located on respective sides of an outward extending hasp staple post.

Lastly, the locking device utilizes a locking pin to form an interference between the cap and the plug. This locking pin may be joined to an outer end of a strap portion of a hasp bracket. Alternately, the pin may be formed with a locking end that fits in a straight shackle-pin type padlock.

For use, the locking plug of the device is fitted onto the actuating nut of a fire hydrant. Two of the set screws then are screwed inward to force at least two sides of the plug inner opening to compressively engage adjacent sides of the hydrant actuating nut. The remaining two or three set screws then are screwed inward to compressively engage the remaining sides of the hydrant actuating nut. Next, the cap is fitted onto the plug. An bottom surface of a top wall of the cap selectively engages a top end of the plug actuator nut to align the cap sidewall slot with the plug peripheral groove. Then, the locking pin is inserted into the cap locking pin passageway to locate in the cap sidewall slot and the plug groove and form an interference fit between the cap and the plug. Where the locking pin is part of a hasp bracket, the hasp bracket is swung upward to locate the cap hasp staple post in a slot in the hasp bracket strap. Lastly, a U-shaped shackle of a padlock is threaded through an aperture in the hasp staple post, and the shackle then is snapped to its locked position. Where the locking pin is to be used with a straight shackle-pin type padlock, this pin is pushed fully through the cap passageway so that the pin locking end may be fitted into this padlock type.

To gain operative access to the actuating nut of a hydrant to which this locking device has been attached, first the padlock is unlocked and removed. Next, the hasp bracket is swung downward to allow withdrawal of the hasp bracket locking pin from the cap locking pin passageway. Alternately, the straight shackle-pin type padlock pin is simply withdrawn from the passageway. Next, the cap is removed. A wrench then is used to turn the locking plug actuator nut and attached hydrant actuating nut to open the hydrant and allow water to discharge from the hydrant.

The fire hydrant locking device of this invention provides several advantages over hydrant locking means presently known or in use.

A first advantage is that this hydrant locking device has a rugged, impact resistant structure. For example, the cap is made of steel with the cap top wall being more than $11/16$ in. thick and the cap sidewall being about $5/16$ in. thick. A cap with such mass is able to withstand considerable impacting forces without suffering undue physical damage during an attempt to gain unauthorized access to the hydrant actuating nut. At the same time the structure of the cap and the locking plug is sufficiently uncomplicated for the cap and locking plug to be made as precision castings requiring minimal machining, if any, to place in final form.

Note further that the hasp bracket strap, in a locked position, is located in a channel defined by side ribs. This structure inhibits use of a prying-type tool to gain access to this bracket strap and thereby gain operative access to the hydrant actuating nut. Access to a top end of the strap of the hasp bracket can be further impeded by placing a washer on hasp staple post to eliminate any space between the shackle of a padlock and an outer side of the hasp bracket strap.

An additional advantage is that the cap is fully rotatable when the device is in a locked condition or unlocked conditioned. The cap can be easily spun to make the padlock readily accessible. Further, this full spinnability of the cap allows ready insertion of the locking pin regardless of the radial position of the cap and eliminates the possibility of shearing of the locking pin by rotating the cap.

A still further advantage is that this hydrant locking device utilizes commercially available padlocks. The end user selects a keying arrangement (keyed separately, keyed alike, for example) and the tamper resistant quality of the lock that best suits the needs of that end user.

Additionally, this locking device is easy to install requiring six simple steps: (1) placement of the locking plug, (2) attachment of the locking plug, (3) placement of the cap, (4) insertion of the locking pin, (5) rotation of the hasp bracket, and (6) padlock placement and padlock locking. Note that step (5) is not required where a straight shackle-pin type padlock is used.

Finally, the structure of this hydrant locking device insures ready operation of the hydrant. Note first that the key slot of the padlock faces downward or outward to inhibit collection of rain water that could freeze and thereby delay unlocking the padlock. Next, note that the grooves in the channel of the cap hasp bracket support provide means for water collecting in this channel and about the strap of the hasp bracket to drain downward. Additionally, the upper end of the locking plug can be provided with a simple lateral slot for plug rotation by a blunt tool rather than a wrench. Lastly, at least two sides of the locking plug inner opening are in contact with adjacent sides of the hydrant actuating nut. The resulting area of engagement is sufficiently large to inhibit scoring of the hydrant actuating nut by the locking plug set screws as the nut is wrenched open.

DESCRIPTION OF THE DRAWING FIGURES

FIG. 2 is a plan view of a cap of the locking device FIG. 3 is an elevation view of a front of the cap of FIG. 2.

FIG. 4 is an elevation view of a side of the cap of FIG. 2.

FIG. 5 is a cross-sectional view of the cap as seen generally along the line 5—5 of FIG. 2.

FIG. 6 is a cross-sectional view of the cap as seen generally along the line 6—6 of FIG. 3

FIG. 7 is a plan view of a locking plug of the device.

FIG. 8 is an elevation view of a front of the plug of FIG. 7.

FIG. 9 is a cross-sectional view of the plug as seen generally along the line 9—9 of FIG. 8.

FIG. 10 an elevation view of a side of a hasp bracket of the locking device.

FIG. 11 is an elevation view of a front of the hasp bracket of FIG. 10.

Figure 12:
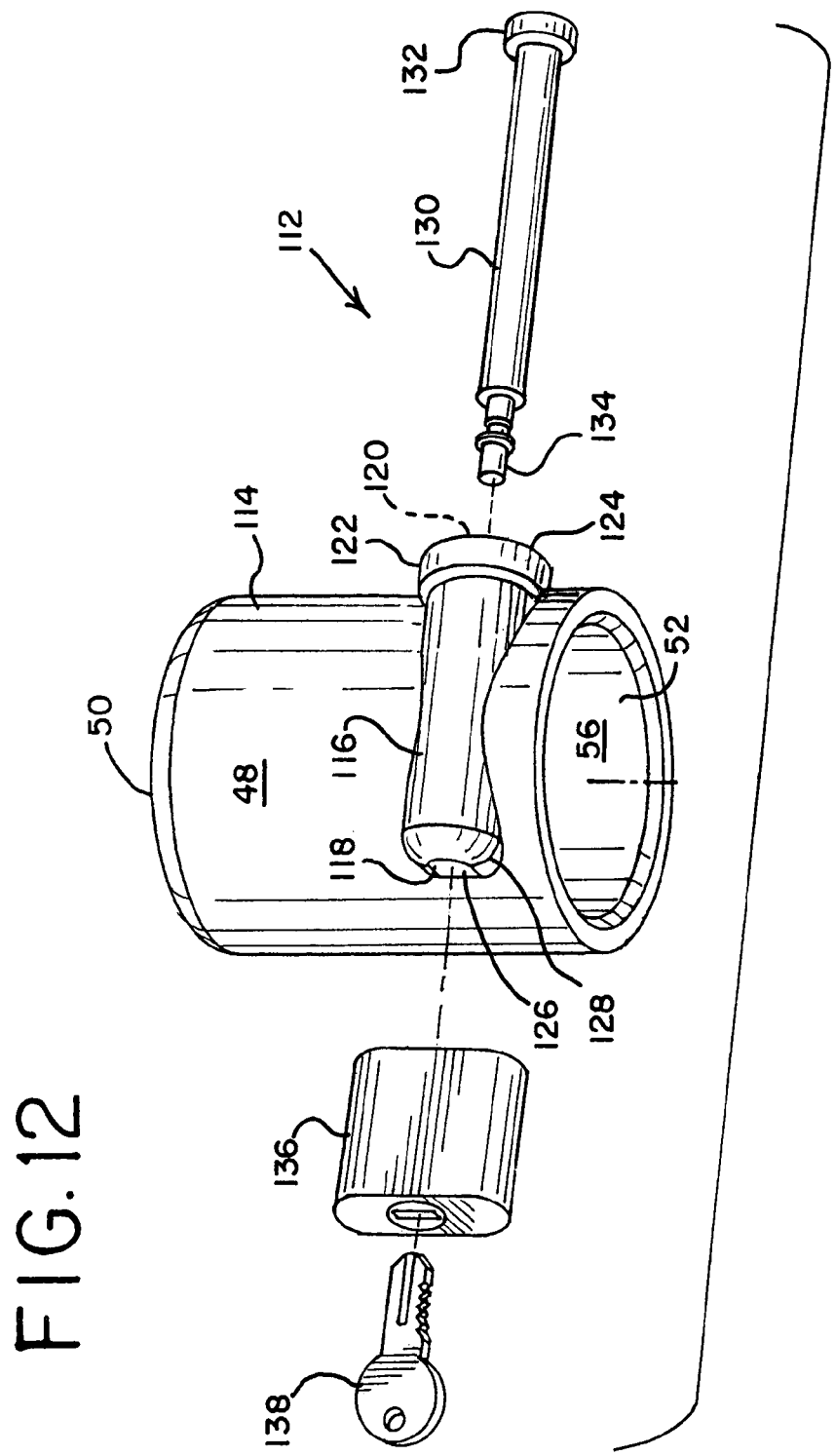

FIG. 12 is a perspective view showing in part of a further embodiment of this inventive locking device also in an exploded format.

DESCRIPTION OF THE PREFERRED EMBODIMENT

Figure 1:
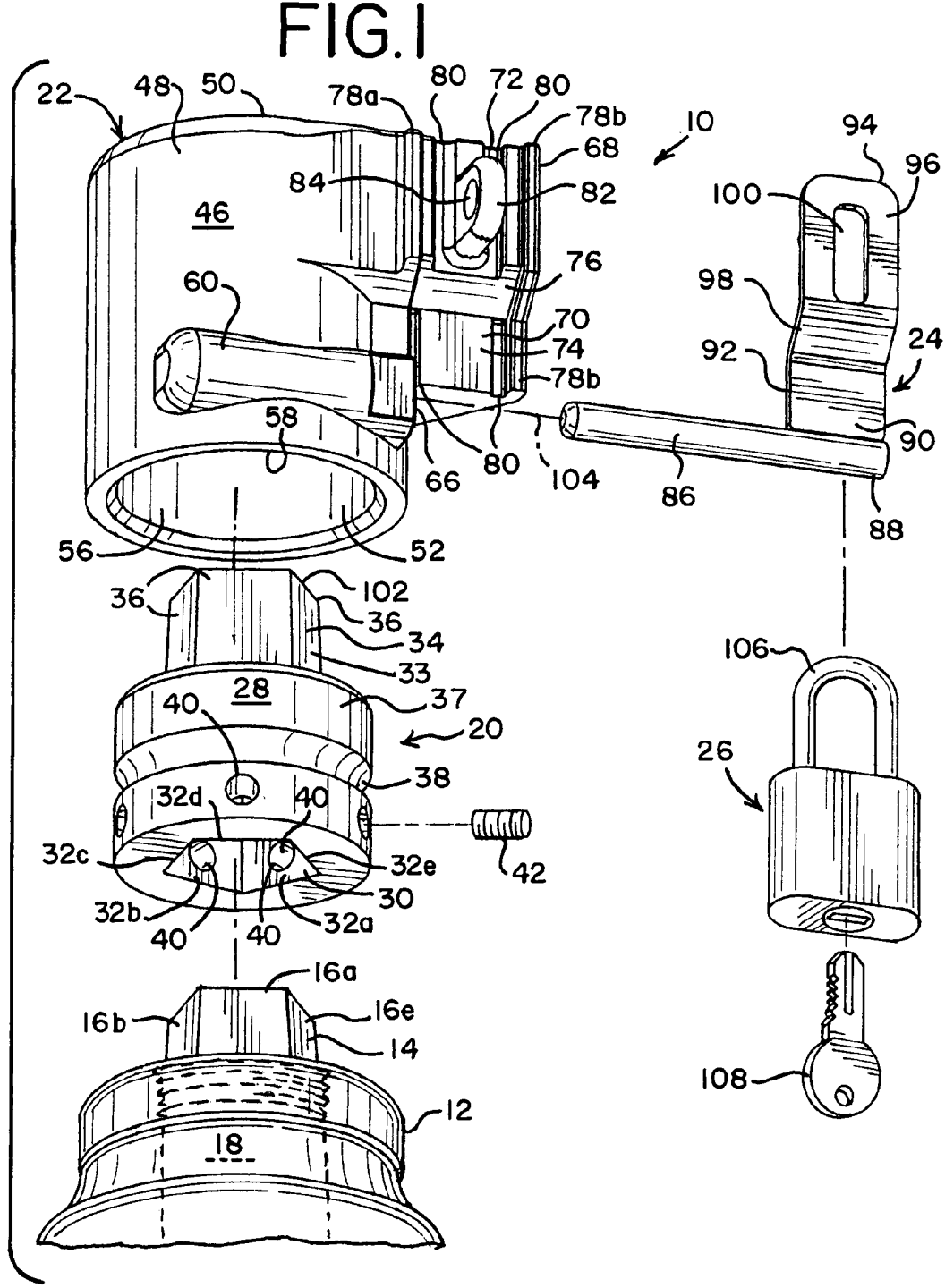
FIG. 1 is a perspective view of a locking device of this invention with the various device components shown in an exploded format.

A locking device, particularly adapted to inhibit unauthorized operation of a fire hydrant, is shown generally in FIG. 1 and designated 10. The hydrant 12 includes an actuating nut 14 having, as shown, five sides 16*a*–*e*. This nut 14 is located on an upper end of a valve stem 18 of the fire hydrant 12.

The major components of this locking device 10 are a locking plug 20, a cap 22, a hasp bracket 24, and a padlock 26 (typically supplied by user of the device 10). The locking plug 20 is shown in detail in FIGS. 7–9 and has a cylindrical-shaped body 28 formed with a downward facing, inner opening 30. As seen in FIGS. 1 and 7, this inner opening 30 is pentagonal-shaped having five sides 32*a*–*e* matching the shape of the fire hydrant actuating nut 14. It should be understood that fire hydrants 12 also may have square-shaped actuating nuts 14 having just four sides 16*a*–*d*. In this case, the plug inner opening 30 would have a complementary square shape.

As shown, an upper end 33 of the locking plug 20 includes a pentagonal-shaped actuator nut 34 having slightly inward tapering sides 36. In a cylindrical sidewall 37 of the plug body 28 is a horizontally positioned, arcuate-shaped peripheral groove 38. Located immediately below this groove 38 is a set of radially spaced apart, horizontally positioned threaded bores 40. The number of bores 40 equals the number of sides 32 (four sides 32*a*–*d* or five sides 32 *a*–*e*) defining the plug inner opening 30. The bores 40 intersect respectively with these plug inner opening sides 32 at their midpoints. Disposed in each threaded bore 40 is a set screw 42.

The cap 22 of the locking device 10 is shown in detail in FIGS. 1, 2–6 and includes an impact resistant steel body 46 defined by a cylindrical-shaped sidewall 48 that connects with a dome-shaped top wall 50. The cap sidewall 48 is about 5/16 in. thick while the top wall 50 is about 11/16 in. thick. An inner surface 52 of the sidewall 46 and a bottom surface 54 of the top wall 50 define a downward facing, cylindrical-shaped, inner opening 56. This inner opening 56 is sized to form a close fit 58 about the locking plug 20 that allows ready longitudinal movement between the plug 20 and the cap 22 while limiting lateral movement to about 1/64 in.

Extending outwardly from the cap sidewall 48 is a horizontally positioned locking pin cylinder 60 formed with an inner passageway 62. This passageway 62 intersects tangentially with the cap sidewall inner surface 52 to form a horizontally positioned, arcuate-shaped slot 64 in the sidewall 48. Then, carried by the cap body 46 and located immediately above an entrance end 66 to the inner passageway 62 is a hasp bracket support 68. This support 68 includes a vertically positioned channel 70 defined by an upper part 72 and a rearwardly offset lower part 74 that are connected by an angularly offset middle part 76. Spaced apart inner and outer ribs 78a, 78b define sides of the channel upper part 72. The channel lower part 74 only includes an outer rib 78b. Next to each rib 78a, 78b in the channel 70 is a vertical groove 80. Lastly, extending outward from the channel upper part 72 and located between the grooves 80 is a hasp staple post 82 formed with an aperture 84.

The hasp bracket 24 of this locking device 10 is shown in detail in FIGS. 10 and 11. This bracket 24 includes a stainless steel locking pin 86 having an outer end 88 attached to a bottom end 90 of a lower segment 92 of a strap 94. The strap 94 further includes an upper segment 96 connected to the lower segment 92 by an angularly offset middle segment 98. In the strap upper segment 96 is a vertically positioned slot 100.

For use, the hydrant actuating nut 14 is fitted into the inner opening 30 of the locking plug 20. Two of the set screws 42 then are threaded inward to engage, for example, aligning sides 16a and 16b of the actuating nut 14 and force opposite sides 16c–e of the actuating nut 14 into compressive engagement with adjacent sides 32c–e of the plug inner opening 30. The remaining set screws 42c–e then are tightened against the nut sides 16c–e.

Next, the cap 22 is fitted onto the locking plug 20 so that the bottom surface 54 of the cap top wall 50 rests on a top end 102 of the plug actuator nut 34. As now located, the cap sidewall slot 64 aligns with the locking plug groove 38. This alignment allows insertion of the hasp bracket locking pin 86 through the cap inner passageway 62 where the pin 86 partially seats in the plug groove 38. A resulting interference fit 104 between the plug groove 38, the hasp bracket locking pin 86, and the cap sidewall slot 64 prevents relative longitudinal movement between the cap 22 and the locking plug 20. Then, the hasp bracket strap 94 is swung upward so that the bracket strap 94 fits snugly in the bracket support channel 70 and the cap staple post 82 fits in the strap slot 100. A final step includes inserting a U-shaped shackle 106 of the padlock 26 though the staple post aperture 84 and snapping the shackle 106 into a locked position. As noted earlier, where the hydrant 12 is located in a high risk location, a washer, not shown, may be placed on the hasp post 82 before placement of the padlock shackle 106 to insure that the padlock shackle 106, the washer, the hasp strap upper segment 96, and the channel 70 fit tightly together.

To open the hydrant 12, first a key 108 is used to unlock the padlock 26 allowing removal of the padlock 26. With the padlock 26 removed, the hasp bracket strap 94 may be lowered allowing withdrawal of the hasp bracket locking pin 86 from the cap inner passageway 62. Next, the cap 22 is removed from the locking plug 20 to provide access to the locking plug upper end 33 and its actuator nut 34. Using a wrench, not shown, prepared to engage the five-sided actuator nut 34, the nut 34 and integrally joined locking plug body 28 are rotated. Since the locking plug 28 is attached to the hydrant actuating nut 14, rotation of the plug body 28 acts to open the hydrant 12. It should be understood that the plug actuator upper end 33 may simply be formed with a lateral slot (not shown) allowing rotation of the plug 20 with a blunt tool rather than a specially prepared five-sided nut wrench. As the plug 20 rotates the hydrant actuating nut 14, the actuating nut sides 16c–e remain in contact with the plug inner opening sides 30c–e to inhibit scoring of the remaining nut sides 16a, b by the setscrews 42. Minimizing scoring insures that the hydrant 12 can be readily opened on future occasions.

A further embodiment of an inventive hydrant locking device is shown generally in FIG. 12 and designated 112. When describing the device 112, like reference numbers are used where the structure of the device 112 is like that of device 10. While not shown the device 112 includes a locking plug 20 that fits into an inner opening 56 of a cap 114 having a like cylindrical-shaped sidewall 48 connecting with a dome-shaped top wall 58. Note that the cap 114 does not include a hasp bracket support 68. Extending outward from the sidewall 48 of the cap 112 is a locking pin cylinder 116. This cylinder 116 is formed with an inner passageway 118. This passageway 118 extends totally through the cylinder 116 from an opening 120 in a collar 122 on an entrance end 124 of the cylinder 116 to an opening 126 in an exit end 128 of the cylinder 116.

This inner passageway 118 allows insertion of an elongated padlock shackle pin 130 through the cylinder passageway 118 so that an enlarged head 132 on an end of the pin 130 may seat against the collar 122. As positioned, the pin 130 forms an like interference fit 104 between the cap 114 and the locking plug 20. As located, a locking end 134 of the shackle pin 130 extends outward from the cylinder exit end 128. This pin locking end 130 is prepared to form a locking fit with a straight shackle-pin type padlock 136 upon insertion to the pin end 134 into the padlock 136. A key 138 is selectively used to unlock the padlock 136 to allow access to the locking plug 20 by removal of the pin 130 and the cap 114.

While the locking device 112 has a somewhat simpler structure than the device 10, the padlock 136 used with the locking device 112 is more susceptible to tampering than the padlock 26.

While embodiments, uses, and advantages of this invention have been shown and discussed, it should be understood that this invention is limited only by the scope of the claims. Those skilled in the art will appreciate that various modifications and changes may be made without departing from the scope and spirit of the invention, and these modifications and changes may result in further uses and advantages.

What we claim is:

1. A locking device to inhibit unauthorized operation of a fire hydrant, said locking device comprising:

a cap having an impact resistant body, said cap body including a sidewall connected to a top wall with an inner surface of said sidewall and a bottom surface of said top wall defining an inner opening, a passageway in said sidewall extending inward from an opening in said sidewall to intersect tangentially with said sidewall inner surface and form a slot in said sidewall inner surface, and a locking plug having a body disposable in said cap inner opening to form a longitudinal operative fit therewith, an inner opening prepared to receive an actuating nut of said hydrant and form a secure operative fit therewith, a groove in a sidewall of said plug body with said groove alignable with said cap sidewall slot, and an upper end of said plug prepared for rotational engagement by a tool, and a locking pin insertable in said cap passageway to locate in said cap sidewall slot and said locking plug groove and form a longitudinal locking fit between said cap and said locking plug, wherein said locking fit inhibits unauthorized operation of a fire hydrant upon said locking plug being secured to said hydrant actuating nut and said cap being secured to said locking plug by said locking pin.

2. A locking device as defined by claim 1 and further characterized by, said cap passageway located in a locking pin cylinder having an entrance end and an exit end, and said pin upon insertion in said passageway having a headed end positioned adjacent to said cylinder entrance end and a locking end extending outward from said cylinder exit end with said pin locking end prepared for insertion into a straight shackle-pin type padlock to form an operative locking fit therewith.

3. A locking device as defined by claim 1 and further characterized by said locking device including a hasp bracket, said bracket comprising said locking pin upon insertion in said passageway to form said interference fit having an end outer end extending from said cap locking cylinder entrance end with said pin outer end attached to a bottom end of a strap of said hasp bracket with an upper segment of said strap formed with a slot to fit about a staple post carried by said cap.

4. A locking device to inhibit unauthorized operation of a fire hydrant, said locking device comprising:

a cap having an impact resistant body, said cap body including an inner opening, a passageway extending between an outer entrance and said inner opening, and a hasp bracket support formed with a staple post, a locking plug having a body disposed in said cap inner opening to form a close lateral fit therewith, an inner opening prepared to receive an actuating nut of said hydrant and form a secure operative fit therewith, a peripheral groove in a sidewall of said plug body, and an upper end prepared for rotational engagement by a tool, and a hasp bracket including a locking pin releaseably disposed in said cap passageway and said plug groove to form a longitudinally inhibiting interference fit between said cap and said plug upon alignment of said cap passageway and said locking plug groove, a strap having a bottom end attached to an outer end of said locking pin and an upper segment formed with a slot prepared to fit about said hasp bracket support staple post, wherein with said staple post fitting in said hasp bracket strap slot, movement of said hasp bracket may be inhibited by insertion of a shackle of a padlock through an aperture in said post and then placement of said padlock in a locked condition.

5. A locking device as defined by claim 4 and further characterized by, said cap hasp bracket support including a channel having ribbed sides and said post positioned in a proximate middle of said channel, wherein said ribbed sides of said channel inhibit access to said bracket strap upon disposition of said bracket strap in said channel.

6. A locking device as defined by claim 5 and further characterized by, said hasp bracket support channel having an upper part and a rearwardly offset lower part connected by an angularly offset middle part and grooves in said channel upper and lower part, wherein said grooves promote release of water collecting in said channel.

7. A locking device as defined by claim 4 and further characterized by, said hasp bracket strap defined by an upper segment joined to a lower segment by an angularly offset middle segment, said segments formed to fit in a complementary manner in said cap hasp bracket support channel.

8. A locking device as defined by claim 4 and further characterized by including, said locking plug inner opening having sides to fit in a complementary manner about sides of said hydrant actuating nut, a set of threaded bores radially spaced about said plug body with said bores extending inward to intersect respectfully with said plug inner opening sides, a set of set screws operatively carried respectfully in said bores and said plug upper end including an actuator nut.

9. A locking device as defined by claim 4 and further characterized by, said locking plug body and said cap inner opening being cylindrically shaped, and said groove having an arcuate cross-sectional shape.

10. A locking device as defined by claim 9 and further characterized by, said cap slot being horizontally positioned in said sidewall and having an arcuate shape.

11. A locking device particularly adapted to be affixed to an actuating nut of a fire hydrant to inhibit unauthorized operation of said hydrant, said device comprising:

a locking plug having a body defined in part by a cylindrical-shaped sidewall, an inner opening in said body having sides prepared to receive said hydrant actuating nut and form a score-resistant locking fit therewith, an upward extending actuator nut, a peripherical groove formed in said sidewall, and a set of spaced apart threaded bores extending through said sidewall to intersect respectively with said inner opening sides, a cap having an impact resistant body defined by a top wall having a thickness at least twice a thickness of a sidewall of said cap body, an inner opening closely fittable about said locking plug to provide operative longitudinal movement between said cap and said locking plug and limited lateral movement between such, a locking pin cylinder carried by said cap sidewall with said cylinder having a passageway intersecting with said locking plug groove upon said cap top wall resting on said locking plug actuator nut, and a hasp bracket support extending outward from said cap sidewall and formed with a channel having ribbed sides and a hasp staple post positioned in an upper part of said channel, and a hasp bracket having a locking pin releasably disposable in said cap passageway and in said plug groove to form a longitudinal interference fit between said cap and said locking plug, a strap having a bottom end attached to an outer end of said locking pin and a slot in an upper segment of said strap fittable about said hasp bracket support post upon said strap fitting snugly in said bracket support channel, wherein a position of said hasp bracket in said channel may be secured by placement of a shackle of a padlock in an aperture of said hasp support post and then pressing said shackle into a locked condition.

\* \* \* \* \*